(12) United States Patent
Kella et al.

(10) Patent No.: US 8,085,289 B1
(45) Date of Patent: Dec. 27, 2011

(54) REDUCING SIDE LOBES WITHIN OPTICAL IRRADIANCE DISTRIBUTIONS USED TO SELECTIVELY EXPOSE PHOTOSENSITIVE SURFACE

(75) Inventors: Dror Kella, Nes-Ziona (IL); Michael Plotkin, Rehovot (IL); Shai Emanueli, Rehovot (IL); Boris Aptekar, Rehovot (IL); Haim Livne, Kfar-Sava (IL); Haim Vladomirski, Rehovot (IL); David Kenney Towner, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 168 days.

(21) Appl. No.: 12/258,092

(22) Filed: Oct. 24, 2008

Related U.S. Application Data

(60) Provisional application No. 61/025,990, filed on Feb. 4, 2008.

(51) Int. Cl.
*B41J 15/14* (2006.01)
*B41J 27/00* (2006.01)
(52) U.S. Cl. ........................ 347/241; 347/256
(58) Field of Classification Search .................. 347/230, 347/241–244, 256–258
See application file for complete search history.

(56) References Cited

U.S. PATENT DOCUMENTS

| | | | |
|---|---|---|---|
| 5,612,942 A | 3/1997 | Takahashi | |
| 5,872,760 A | 2/1999 | Kim et al. | |
| 6,195,208 B1 | 2/2001 | Ngoi et al. | |
| 6,977,781 B2 * | 12/2005 | Takeuchi et al. | 359/738 |
| 7,042,608 B2 * | 5/2006 | Takeuchi et al. | 359/210.1 |
| 7,280,206 B2 * | 10/2007 | Wildnauer et al. | 356/328 |
| 2004/0155950 A1 | 8/2004 | Takeuchi et al. | |
| 2004/0218242 A1 | 11/2004 | Takeuchi et al. | |

FOREIGN PATENT DOCUMENTS

JP 08249712 A * 9/1996

* cited by examiner

*Primary Examiner* — Hai C Pham

(57) ABSTRACT

An optical beam is selectively output towards a scanner in accordance with image data for a scan line of an image. The optical beam has a beam irradiance distribution that is elliptical in shape. The optical beam passes through an aperture stop, ordinarily creating side lobes within a focus irradiance distribution of the optical beam. The scanner scans the optical beam to form the scan line on a photosensitive surface by selectively exposing positions along the scan line in accordance with image data. The optical beam is modified before it reaches the photosensitive surface to substantially remove the side lobes that have been created within the focus irradiance distribution and/or to substantially prevent the side lobes from being created within the focus irradiance distribution of the optical beam.

1 Claim, 8 Drawing Sheets

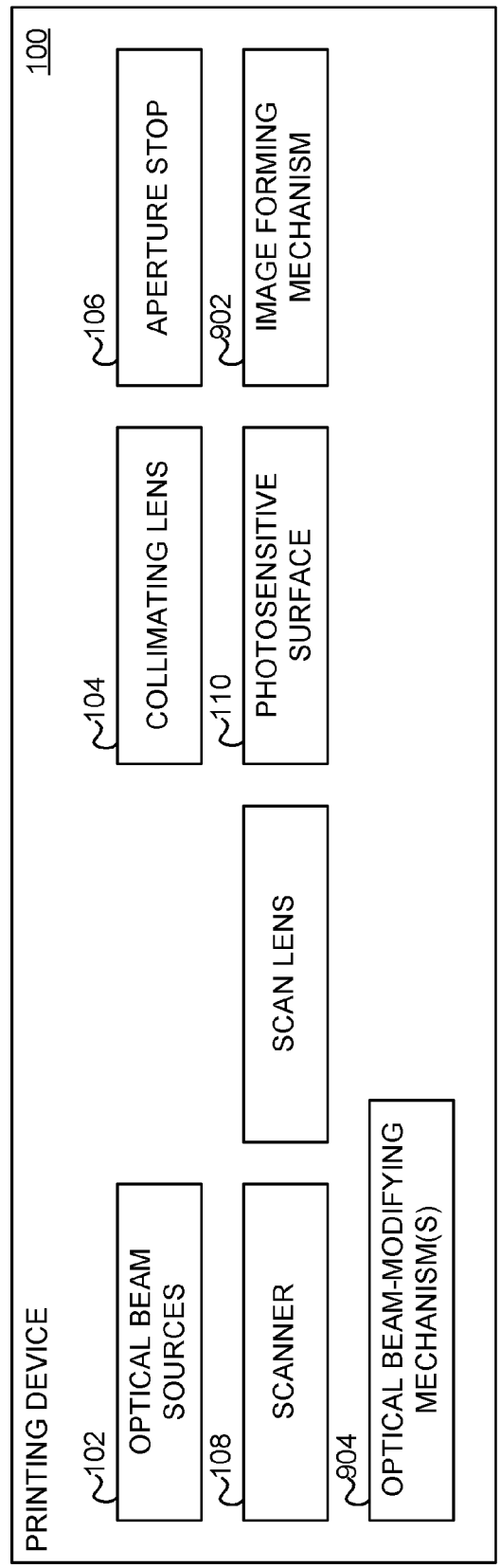

US 8,085,289 B1

REDUCING SIDE LOBES WITHIN OPTICAL IRRADIANCE DISTRIBUTIONS USED TO SELECTIVELY EXPOSE PHOTOSENSITIVE SURFACE

CROSS REFERENCE TO RELATED APPLICATIONS

This Application claims the benefit of provisional patent application Ser. No. 61/025,990, filed Feb. 4, 2008 titled "REDUCING SIDE LOBES WITHIN OPTICAL IRRADIANCE DISTRIBUTIONS USED TO SELECTIVELY EXPOSE PHOTOSENSITIVE SURFACE" which application is incorporated by reference herein as if reproduced in full below.

BACKGROUND

Some types of printing devices employ one or more laser beams to selectively expose, on a scan line-by-scan line basis, positions on a photosensitive surface in correspondence with an image to be printed. Some types of laser beams, such as those commonly used within a printing device employing more than one laser beam, can have beam cross-sectional irradiance distributions that are elliptical in shape. When such laser beams pass through an aperture, unintended and undesirable side lobes may be created within the focused spot irradiance distributions at the image surface. These side lobes can deleteriously affect the image quality of the resulting image that is printed using the printing device in question.

BRIEF DESCRIPTION OF THE DRAWINGS

FIG. 9 is a block diagram of a rudimentary printing device, according to an embodiment of the present disclosure.

DETAILED DESCRIPTION OF THE DRAWINGS

Figure 1:
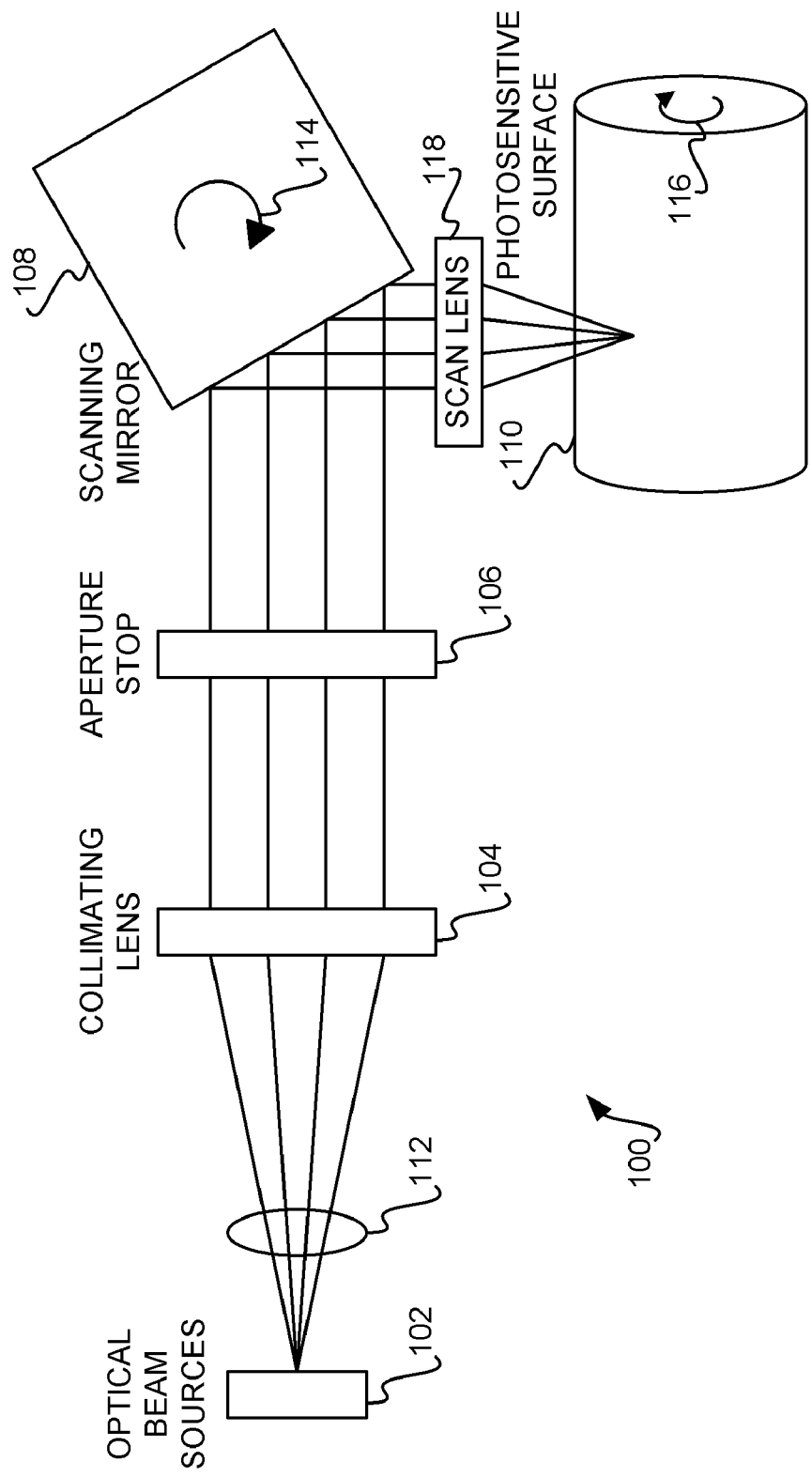
FIG. 1 is a diagram of a portion of a printing device in relation to which embodiments of the present disclosure can be implemented.

FIG. 1 shows a portion of a printing device 100, in relation to which embodiments of the present disclosure may be implemented. The printing device 100 is depicted in FIG. 1 as including one or more optical beam sources 102, a collimating lens 104, an aperture stop 106, a scanner 108, a scan lens 118, and a photosensitive surface 110, which in one embodiment can be a drum as specifically depicted in FIG. 1. Those of ordinary skill within the art can appreciate that the printing device 100 can and typically will include other components, in addition to and/or in lieu of those depicted in FIG. 1

The printing device 100 is more generally an image-forming device, in that it forms images (i.e., prints images) on media, such as sheets of paper. The printing device 100 may be an electrophotographic printing device in that it selectively charges or discharges a photosensitive surface 110, where the surface 110 is particularly photoconductive, in correspondence with the image to be formed or printed, where this image may have been received as image data from a computing device, for instance. Examples of electrophotographic printing devices include laser printing devices using a dry electrophotographic process, which fuse dry toner onto media in accordance with image data to print the images, as well as liquid electrophotographic (LEP) printing devices, which apply at least semi-liquid ink or toner onto media in accordance with image data to print the images.

The optical beam sources 102 can include one or more laser beam sources, or other types of optical beam sources. The optical beam sources 102 may be separate or integrated optical beam sources, such as one or more laser diodes formed on the same epitaxial substrate. The optical beam sources 102 output one or more optical beams 112, such as laser beams. It is noted that having more optical beams originating from more than one optical beam source 102 is desirable to increase the rate at which the electrophotographic printing device 100 is able to form images—that is, the speed at which the printing device 100 is able to print—which may be measured by pages-per-minute (PPM) or another unit of performance.

The optical beams 112 as output pass through a collimating lens 104. The collimating lens 104 may itself include one or more lens elements. The collimating lens 104 collimates the optical beams 112. That is, the collimating lens 104 changes the divergence of the optical beams 112 so that all the rays within each optical beam 112 are at least substantially in parallel with one another.

The optical beams 112 also pass through an aperture stop 106. An aperture is an opening through which the optical beams 112 are admitted. More specifically, the aperture is the opening that determines the portion of each optical beam 112 that subsequently passes through the scan lens 118 and converges to a focused spot at the photosensitive surface 110. The dimensions of aperture stop 106, together with the scan-direction and cross-scan-direction focal lengths of scan lens 118, and other geometric parameters, determine the convergence angles of the optical beams 112 in the scan-direction and cross-scan-directions at an image location. These convergence angles, together with the wavelength of optical beams 112, determine a scan-direction and a cross-scan-direction focused spot size, as determined primarily by diffraction and as can be appreciated by those of ordinary skill within the art.

It is noted that the configuration of the components of the printing device 100 depicted in FIG. 1 is exemplary, and can be modified. For instance, the aperture stop 106 is depicted as being the last component before the scanner 108. However, in another embodiment, it may be located before the collimating lens 104, and not after the collimating lens 104. Additional components such as anamorphic prisms for compensating beam ellipticity and cylindrical lenses for compensating scanning mirror wobble may also be included in the optical path between the collimating lens and the scanning mirror, as can also be appreciated by those of ordinary skill within the art.

The optical beams 112 are redirected by the scanner 108. The scanner may be a polygonal scanning mirror, exemplarily depicted in FIG. 1 as being a square, although it can be another polygonal shape, such as a hexagon, an octagon, and so on, or it may be another type of scanner such as a prism, a diffraction grating, a hologram, an acousto-optic deflector or electro-optic deflector. The scanner 108 rotates, such as indicated by the arrow 114 in FIG. 1. The scanner 108 redirects the optical beams 112 towards the photosensitive surface 110, such that the scanner 108 scans the optical beams through a scan lens 118 and onto the photosensitive surface 110 where they form substantially focused spots.

The photosensitive surface 110, which may be in the form of a drum or a belt, may include a photoconductor. If so, the surface 110 is initially charged positively or negatively, and at locations where the focused spots formed by optical beams 112 expose the drum 110, the photoreceptive surface 110 is discharged (i.e., from positive or negative to a reduced positive or negative charge or to no charge). The photosensitive surface 110 also translates in substantially the cross-scan direction, such as indicated by the arrow 116 in FIG. 1. In case of imaging drum having photosensitive surface, such translation may be produced by its rotation.

Ultimately, the surface 110, where it is photoconductive, is selectively charged or discharged in correspondence with image data for an image to be printed by an electrophotographic printing device 100, or another type of photosensitive surface 110, such as a photographic emulsion is exposed in correspondence with image data for an image to be printed by the printing device 100. The optical beams 112 are selectively output by the optical beam sources 102 in correspondence with scan lines of the image, where the image is divided into a number of such scan lines.

Selectively outputting optical beams 112 includes modulation of the output power of optical beam sources 102. The scanning mirror scans each optical beam 112 as selectively output, through scan lens 118 and onto a corresponding scan line on the photosensitive surface 110, to selectively expose positions on this scan line of the photosensitive surface 110. In an electrophotographic printer, the resulting exposure pattern on the surface 110 is developed with toner or ink such that the toner or ink stays on the surface 110 where the surface is charged (or discharged). The developed toner or ink image is then transferred to media, such as paper.

Figure 2:
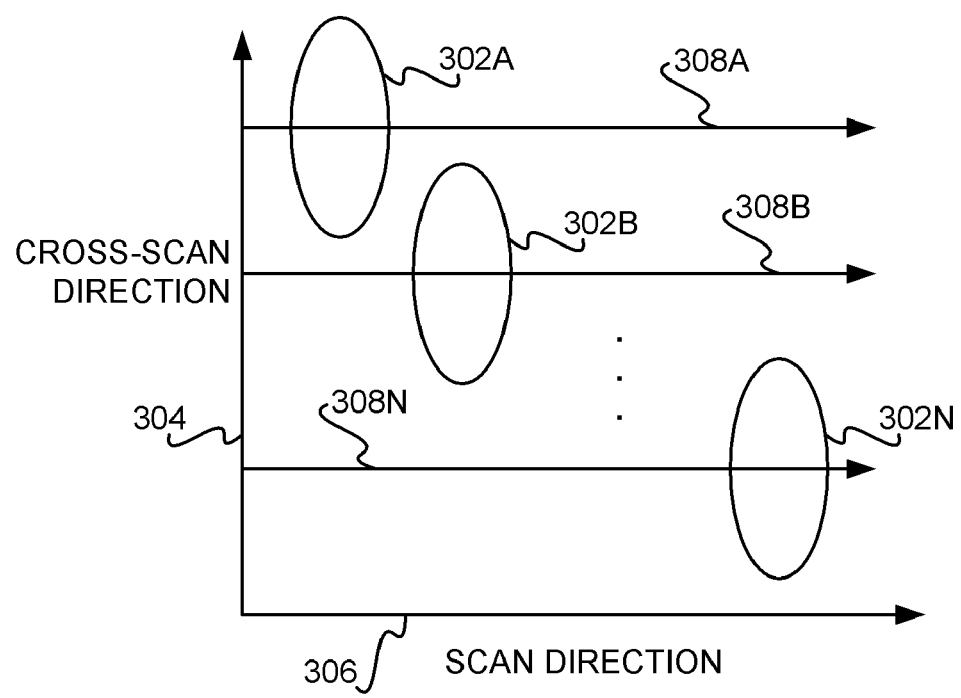
FIG. 2 is a diagram of the focused spots, each of which is represented by a single irradiance contour, of multiple optical beams of a printing device, according to an embodiment of the present disclosure.

FIG. 2 illustrates this scanning process in more detail, according to an embodiment of the present disclosure. The optical beams 112 (which are not particularly called out in FIG. 2) are scanned in accordance with the scan direction indicated by the arrow 306. The cross-scan direction is perpendicular to the scan direction, and is indicated by the arrow 304 in FIG. 2. Optical beams 112 are brought to focus substantially on the photosensitive surface 110 (which is not particularly called out in FIG. 2) to form focused spots 302A, 302B, ..., 302N, collectively referred to as the focused spots 302.

The focused spots 302 are arranged to have a separation distance in the cross-scan direction and are scanned across the photosensitive surface 110 in the scan direction to expose a number of corresponding scan lines 308A, 308B, ..., 308N, collectively referred to as the scan lines 308, and which correspond to the optical beams 112. Thus, the scanner 108 collectively scans the optical beams 112 from one side of the photosensitive surface 110 to the other side of the photosensitive surface 110, to expose a corresponding number of scan lines in which the optical beam 112A exposes the scan line 308A in its entirety, the optical beam 112B exposes the scan line 308B in the same manner, and so on.

Having multiple optical beams 112 scan across the photosensitive surface to form multiple scan lines 308 increases the rate at which the scan lines 308 can be selectively exposed. For instance, one such optical beam may be able to selectively expose one given scan line in a time t. In general, then, having N optical beams 112 increases the number of scan lines that can be selectively exposed during time t by a factor of N.

Each of the focused spots 302 is represented in FIG. 2 by a single irradiance contour. Each of the focused spots 302 corresponds to one of the optical beams 112A, 112B, ..., 112N. As can be seen in FIG. 3, the focused spots 302 are generally elliptical in shape. In the example of FIG. 3, the major axes of the ellipses of the focused spots 302 are aligned in the cross-scan direction and the scan direction indicated by the arrows 304 and 306, respectively.

Figure 3A:
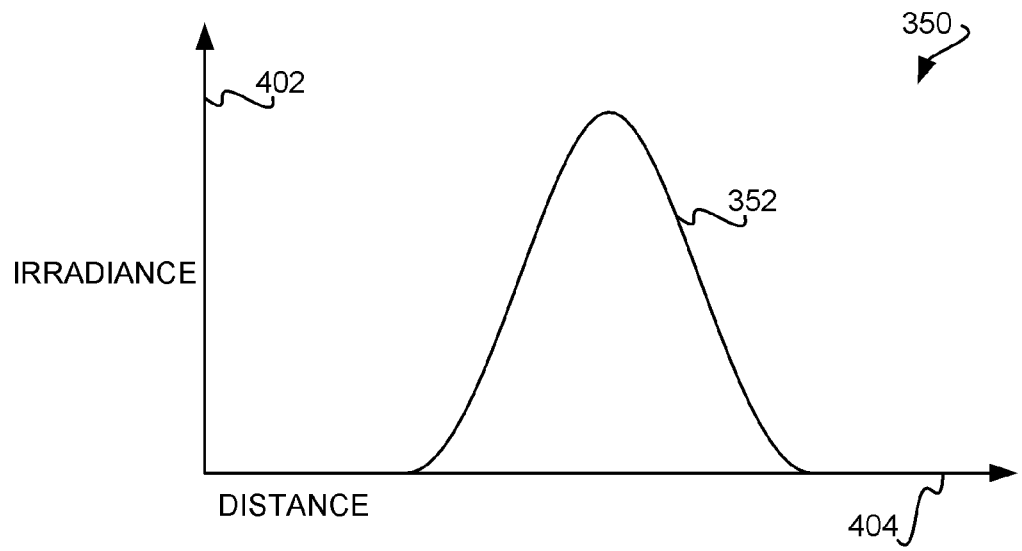
FIGS. 3A and 3B are diagrams of the irradiance profile of a representative optical beam of a printing device, before and after being truncated in passing through an aperture stop, respectively, according to an embodiment of the present disclosure.

FIG. 3A shows the irradiance profile 350 of an exemplary optical beam 112 prior to the optical beam 112 passing through the aperture stop 106, according to an embodiment of the present disclosure. Irradiance is a measure of optical power per unit area. An irradiance profile shows irradiance as a function of position along a specified direction, providing for a two-dimensional representation of a three-dimensional irradiance distribution. Thus, a cross-scan irradiance profile may, for example, show irradiance as a function of the cross-scan position, whereas showing the full irradiance distribution of a beam would require representing irradiance as a function of both the scan and the cross-scan positions over the cross-section of the beam.

In FIG. 3A, then, the irradiance profile 350 indicates irradiance as denoted on the y-axis 402 as a function of distance as denoted on the x-axis 404. The distance denoted on the x-axis 404 is the cross-scan distance, such that the irradiance profile 350 of FIG. 3A is the cross-scan irradiance profile of an exemplary optical beam 112 prior to the beam 112 passing through the aperture stop 106. It is noted that the irradiance profile 350 is at least substantially a Gaussian curve 352.

Figure 3B:
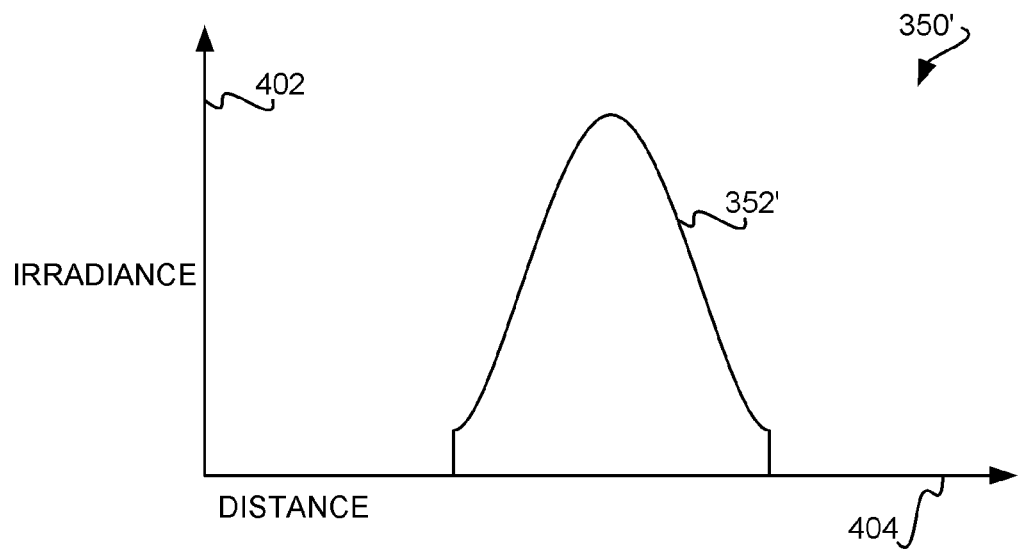

By comparison, FIG. 3B shows the irradiance profile 350' of an exemplary optical beam 112 after the optical beam 112 passes through the aperture stop 106, according to an embodiment of the present disclosure. As in FIG. 3A, the irradiance profile 350 indicates irradiance as denoted on the y-axis 402 as a function of distance as denoted on the x-axis 404. The distance denoted on the x-axis 404 is the cross-scan distance, such that the irradiance profile 350' of FIG. 3A is the cross-scan irradiance profile of an exemplary optical beam 112 after the beam 112 passes through the aperture stop 106. The irradiance profile 350' is also substantially a Gaussian curve 352', but one that has been truncated at its edges due to the optical beam 112 having passed through the aperture stop 106. The truncation of the Gaussian irradiance profile shown in FIG. 3B is a consequence of optical design tradeoffs that ordinarily are made between maximizing power throughput (which tends to minimize the amount of beam truncation) and minimizing focused spot size (which tends to maximize the amount of beam truncation).

Figure 4A:
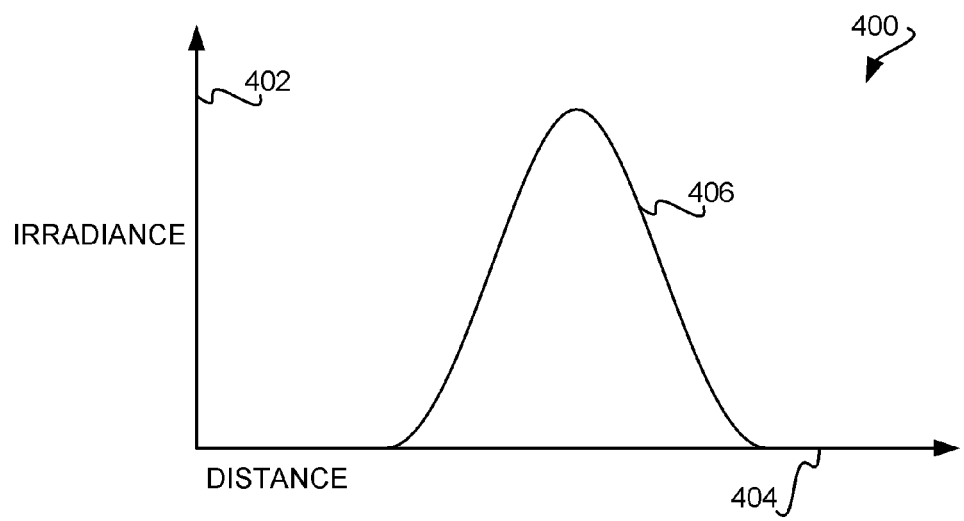
FIGS. 4A and 4B are diagrams of the irradiance profile of a representative optical beam of a printing device at the focus of the optical beam, where in FIG. 4A the beam has not been truncated by an aperture stop, and in FIG. 4B the beam has been truncated by an aperture stop, according to an embodiment of the present disclosure.

Next, FIG. 4A shows the focused spot irradiance profile 400 produced by an exemplary optical beam 112 that has not been significantly truncated by an aperture stop 106, such as the beam 112 that has the irradiance profile 350 of FIG. 3A, according to an embodiment of the present disclosure. It is noted that the difference between FIG. 4A and FIG. 3A is that FIG. 4A depicts the irradiance profile 400 of an optical beam 112 after the beam 112 has been brought to a focus by the scan lens 118, whereas FIG. 3A depicts the irradiance profile 350 of the beam 112 before the beam 112 has been brought to a focus by the scan lens 118. That is, FIG. 4A depicts the irradiance profile 400 for such an optical beam 112 after the beam 112 has propagated to an image location to form a focused spot near the photosensitive surface 110.

The irradiance profile 400 of FIG. 4A is representative of an optical beam 112 that has not been significantly truncated by the aperture stop 106. The substantially Gaussian curve 352 (of FIG. 3A) of the optical beam 112 emitted by an optical beam source 102 remains Gaussian as it propagates and forms a focused spot at the surface 110 that also has a substantially Gaussian irradiance profile as shown by the substantially Gaussian curve 406. The irradiance profile 400 is again specifically a measure of the power per unit area (i.e., irradiance) of the optical beam 112, as indicated on the y-axis 402, as a function of distance, as indicated on the x-axis 404. The distance indicated by the x-axis 404 in this respect is specifically along the cross-scan direction denoted by the arrow 304 in FIG. 2.

Figure 4B:
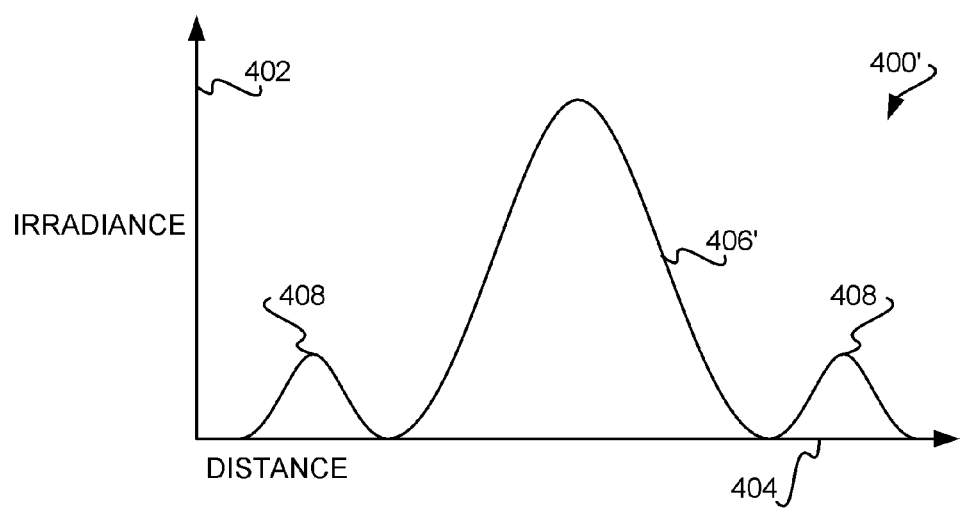

FIG. 4B shows the focused spot irradiance profile 400' produced by an exemplary optical beam 112 having a beam irradiance distribution that has been truncated by the aperture stop 106 as depicted in FIG. 3B, after the beam 112 has passed through the aperture stop 106 and propagated to an image location near the surface 110, according to an embodiment of the present disclosure. It is noted that the difference between FIG. 4B and FIG. 3B is that FIG. 4B depicts the irradiance profile 400' of an optical beam 112 after the beam 112 has been brought to a focus by the scan lens 118, whereas FIG. 3B depicts the irradiance profile 350' of the beam 112 before the beam 112 has been brought to a focus by the scan lens 118. That is, FIG. 4B depicts the irradiance profile 400' for such an optical beam 112 after the beam has propagated to an image location to form a focused spot near the photosensitive surface 110.

The irradiance profile 400' is again a measure of the power per unit area (i.e., irradiance) of the optical beam 112, as denoted by the y-axis 402, as a function of distance, as denoted by the x-axis 404. Also as before, the distance denoted by the x-axis 404 is specifically along the cross-scan direction in FIG. 4B (i.e., the direction denoted by the arrow 304 in FIG. 3). As shown in FIG. 4B, the focused spot irradiance profile 400' no longer has a Gaussian shape but exhibits side lobes 408, which may not be fully separate from the central lobe as shown here for purposes of illustration. The side lobes 408 are created as a result of diffraction as the truncated optical beam 112 propagates from the aperture stop 106 to the image location at the photosensitive surface 110, as can be appreciated by those of ordinary skill within the art.

Where the central lobe 406' of the irradiance profile 400' exposes a given scan line of the image on the photosensitive surface 110, the cross-scan position of side lobes 408 may correspond to the cross-scan position of a scan line previous to this given scan line, and to the cross-scan position of a scan line subsequent to this given scan line. For instance, the side lobes 408 may correspond to a scan line that is two scan lines above the given scan line and to a scan line that is two scan lines below the given scan line. Depending of the orientation of the major axis of the elliptical irradiance distribution of the optical beam 112, the direction of greatest beam truncation and, consequently, the direction of side lobe separation, may be in another direction such as the scan direction. In this case side lobes may expose positions along a scan line before and after the central lobe of the focused spot irradiance distribution.

It has been found that the presence of these side lobes 408 can degrade the image quality of images formed by the printing device 100. For instance, if a straight line along a given scan line is desired to be formed or printed, the presence of the side lobes 408 can result in non-uniform development of the edges of the straight line being formed or printed such that it has an irregular appearance, particularly if the side lobes from nearby scan lines interact with the exposure of the desired scan line. Another undesired effect of the presence of the side lobes 408 is increased sensitivity of printed patterns to scan line positioning errors in the cross-scan direction. Such errors inevitably exist in a printing device due to optical adjustment errors, variations in the speed of the photosensitive surface, mechanical vibrations, and other causes, such as misalignments of the various components within FIG. 1. This increased sensitivity shows up as visible banding artifacts in printed output. Therefore, embodiments of the present disclosure are concerned with modifying the optical beams 112 so that the side lobes 408 that are ordinarily created when the beams 112 pass through the aperture stop 106 are instead substantially not created, and/or so that the side lobes 408 that are indeed created when the beams 112 pass through the aperture stop 106 are substantially removed.

Figure 5A:
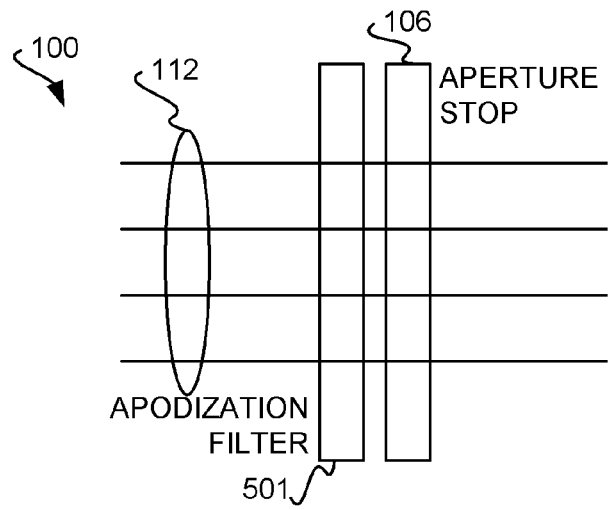
FIG. 5A is a diagram of an apodization filter employed within a printing device, according to an embodiment of the present disclosure.
Figure 5B:
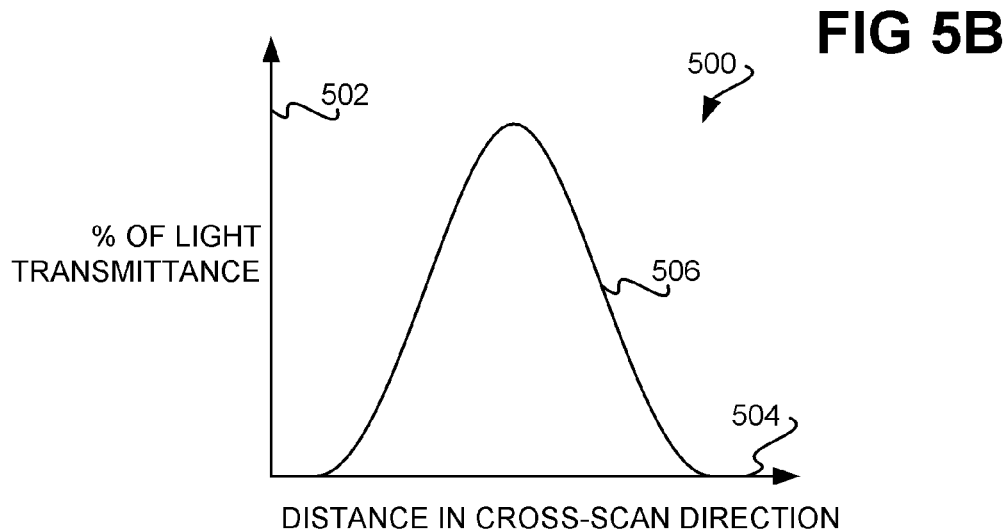
FIGS. 5B and 5C are diagrams of the transmittance of an apodization filter in the cross-scan and the scan directions, respectively, according to an embodiment of the present disclosure.
Figure 5C:
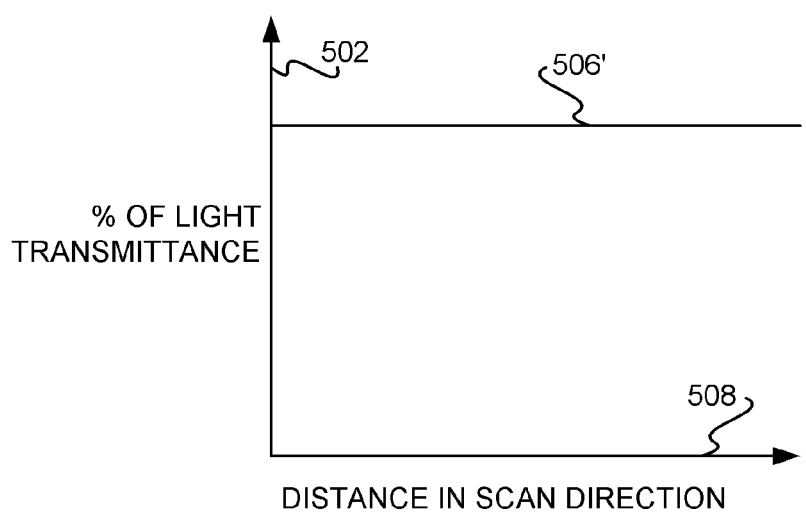

FIGS. 5A, 5B, and 5C depict an approach by which the optical beams 112 can be modified so that the side lobes 408 that are ordinarily created when the beams 112 pass through the aperture stop 106 are instead substantially prevented from being created. FIG. 5A shows how an apodization filter 501 is positioned adjacent to or at the aperture stop 106 within the printing device 100, according to an embodiment of the present disclosure. The term "apodize" is derived from the Greek "a poda" meaning "without feet", and refers to techniques for removing side lobes by changing the shape of a mathematical function, an electrical signal, or an optical light distribution. In optics, an apodization function can be used to minimize diffraction effects at a focus by modifying an irradiance distribution at an aperture stop or pupil in an optical system.

The apodization filter 501 filters the optical beams 112 via a spatially varying transmittance function in, for example, the cross-scan direction (i.e., indicated by the arrow 304 in FIG. 3) to reduce irradiances of the optical beams 112 at their perimeters in the cross-scan direction. Such filtering at least substantially prevents the side lobes 408 from being created when the optical beams 112 subsequently pass through the aperture stop 106, or substantially reduces the height of the side lobes 408. The apodization function of the apodization filter 501, in this example, is spatially varying in the cross-scan direction, and is uniform in the scan direction (i.e., indicated by the arrow 306 in FIG. 3).

In particular, FIG. 5B shows an exemplary spatially varying transmittance function 500 of the apodization filter 501 in the cross-scan direction, according to an embodiment of the present disclosure. The function 500 denotes the percentage of light transmittance, as indicated by the y-axis 502, as a function of distance in the cross-scan direction, as indicated by the x-axis 504. The curve 506 of the function 500 can be Gaussian. Thus, at or near the location of the aperture stop or a pupil (an image of the aperture stop), the Gaussian curve 506 of the transmittance function 500 of the apodization filter 501 is multiplied by the truncated Gaussian irradiance distribution of the optical beam, to render the resulting irradiance profile of the beam more nearly Gaussian in the cross-scan direction in this example after passing through the aperture stop. Fourier transform analysis shows that spatial frequency components that would otherwise appear as side lobes in the diffraction image are strongly suppressed when the irradiance discontinuity caused by the aperture stop is minimized by the apodization filter. It has been found that the result is that when optical beam subsequently passes through the aperture stop 106, the side lobes 408 are substantially not created (i.e., they are significantly reduced in height).

By comparison, FIG. 5C shows a uniform transmittance function 500' of the apodization filter 501 in the scan direction, according to an embodiment of the present disclosure. The function 500' likewise denotes the percentage of light transmittance, as indicated by the y-axis 502, as a function of distance in the scan direction, as indicated by the x-axis 508. The line 506' of the function 500' is straight, denoting that the transmittance function 500' of the apodization filter 501 does not spatially vary in the scan direction, in contradistinction to the transmittance function 500' of the filter 501 in the cross-scan direction. Although the apodization filter used in this example has variable transmittance only in the cross-scan direction, side lobes can be aligned in any direction and the apodization filter can have variable transmittance in another direction or in more than one direction.

Figure 6:
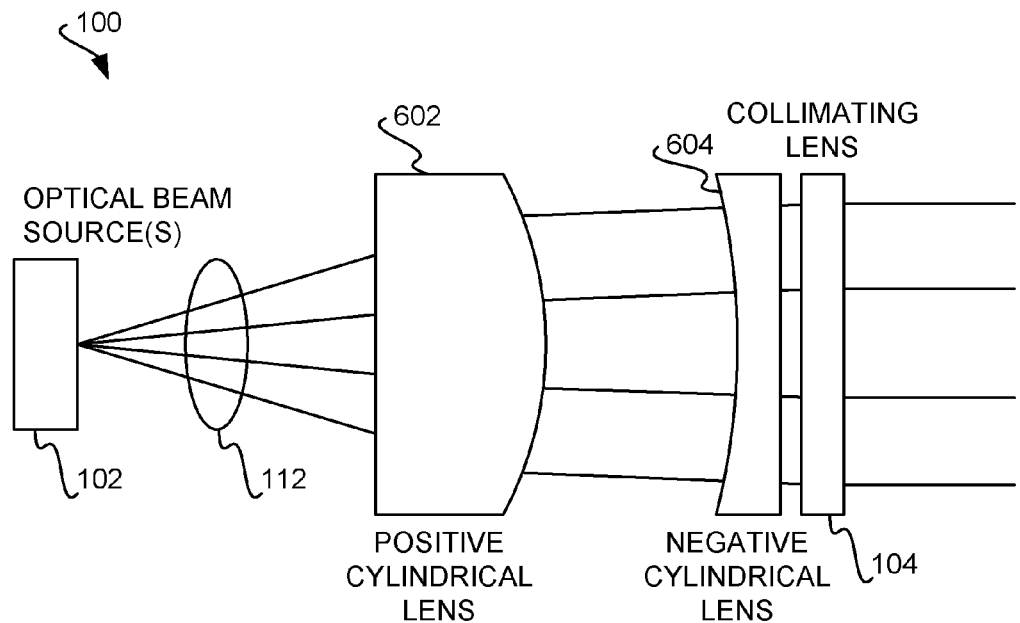
FIG. 6 is a diagram of a cylindrical lens employed within a printing device, according to an embodiment of the present disclosure.

FIG. 6 depicts another approach by which the optical beams 112 can be modified so that the side lobes 408 that are ordinarily created when the beams 112 pass through the aperture stop 106 are instead substantially prevented from being created. FIG. 6 specifically shows how a positive cylindrical lens 602 and a negative cylindrical lens 604 are positioned between the optical beam sources 102 and the collimating lens 104 within the printing device 100 wherein the cylinder lenses have optical power only in the cross-scan direction, according to an embodiment of the present disclosure. Each of the lenses 602 and 604 may include one or more lens elements in one embodiment. The optical beams 112 pass through the lenses 602 and 604 before passing through the collimating lens 104 (and thus before the beams 112 pass through the aperture stop 106).

The lens 602 is a positive cylindrical lens 602 in that it has a convex cylindrical curvature profile in the cross-scan direction on at least one surface and positive overall optical power in the cross-scan direction. It is noted, however, that the lens 602 does not need a curvature in the scan direction. The lens 604 is a negative cylindrical lens 604 in that it has a concave cylindrical curvature profile on at least one surface in the cross-scan direction and negative overall optical power. It is also noted that the lens 604 does not need a curvature in the scan direction. Furthermore, the absolute value of the cylindrical optical power of the lens 602 is greater than the absolute value of the cylindrical optical power of the lens 604. That is, the absolute value of the cross-scan focal length of the lens 602 is smaller than the absolute value of the cross-scan focal length of the lens 604. In fact, the curvature of the lens 604 may be very small in at least some embodiments (i.e., the radius of curvature of the lens 604 is relatively large).

The lens 602 anamorphically reshapes the optical beam 112 so that irradiance contours in the beam irradiance distributions are substantially circular or so that their ellipticity is significantly reduced, forming low aspect ratio elliptical contours at the location of lens 604 instead of high aspect ratio elliptical contours. Thus, the lens 602 effectively compresses the irradiance distribution of the optical beam in the cross-scan direction so that at the location of lens 604 and over the plane defined by the cross-scan direction and the scan direction, the irradiance contours in the beam irradiance distribution are at least substantially circular.

The lens 604 removes astigmatism that is introduced within the optical beam 112 due to the beam 112 passing through the lens 602, so that the wavefronts of the optical beam 112 exiting lens 604 are substantially spherical. As can be appreciated by those of ordinary skill within the art, such a spherical wavefront can be desirable so that a conventional collimating lens 104 can be employed, to minimize changes in shape of the beam irradiance profiles as the beams propagate beyond the collimator, and to minimize aberrations in the final image. In combination, lenses 602 and 604 anamorphically reshape the irradiance distribution within beams 112 at the aperture stop to more closely match the shape of the aperture stop. Consequently, the irradiance distributions of beams 112 reaching the aperture stop 106 do not require significant truncation in the cross-scan direction in order to achieve a focused image spot of the required dimensions. Thus, the Gaussian irradiance profiles characteristic of optical beam 112 as it is emitted by optical beam source 102 are substantially preserved at and beyond the aperture stop with the result that beam truncation is minimized and side lobes 408 are minimized or are not created within the image spot. Although the foregoing description of FIG. 6 presents a solution for side lobes oriented in the cross-scan direction, it is understood that the side lobes and the power of the cylindrical lenses used to correct them may be oriented in the scan direction or in another direction, as can be appreciated by those of ordinary skill within the art.

Figure 7:
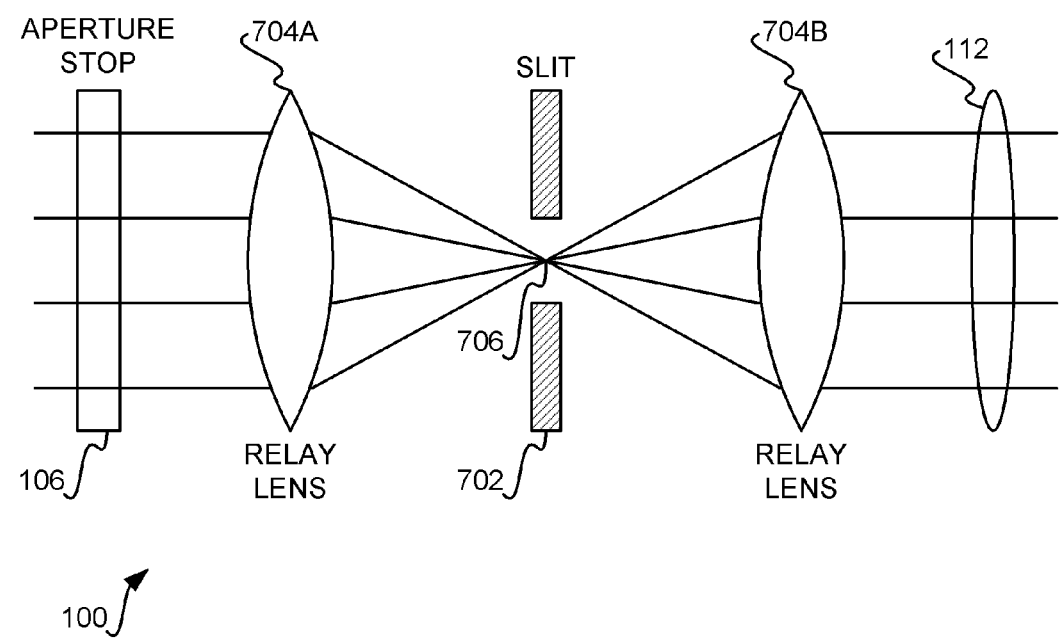
FIG. 7 is a diagram of a slit employed within a printing device, according to an embodiment of the present disclosure.

FIG. 7 depicts an approach by which the optical beam 112 can be modified to remove the side lobes 408 that are created within the focused spot irradiance profile 400 due to the beam 112 having passed through the aperture stop 106. FIG. 7 specifically shows how a slit 702 is positioned at a real intermediate image 706 of the optical beam 112 located after the aperture stop 106 in the cross-section direction, according to an embodiment of the present disclosure. As can be appreciated by those of ordinary skill within the art, one manner by which such an intermediate image 706 can be created is by using a pair of relay lenses 704A and 704B, collectively referred to as the relay lenses 704.

The slit 702 may be defined by a rectangular opening within an otherwise opaque material. The slit 702 spatially filters the optical beam 112 at the intermediate image 706 to substantially remove the side lobes 408 that have been created within the focused spot irradiance profile 400 in the cross-scan direction. The slit 702 has its longer side oriented substantially along the scan direction in this case.

The width of the slit 702 along its shorter side (oriented along the cross-scan direction) is selected to permit the primary portion of the irradiance distribution, such as the central lobe 406' in FIG. 4B, to pass through the slit 702, and to block the side lobes 408 from passing through the slit 702 in this example. This width can be determined by analytical modeling, empirically during system adjustment or by another approach. The end result is that when an optical beam having the focused spot irradiance profile 400' of FIG. 4B passes through the slit 702, the side lobes 408 are removed. That is, the irradiance profile 400' substantially includes just the central lobe 406', and not the side lobes 408, after the optical beam in question passes through the slit 702. Although the foregoing description of FIG. 7 presents a solution for side lobes oriented in the cross-scan direction, it is understood that the side lobes and the shorter side of the slit used to correct them may be oriented in the scan direction or in another direction.

Figure 8:
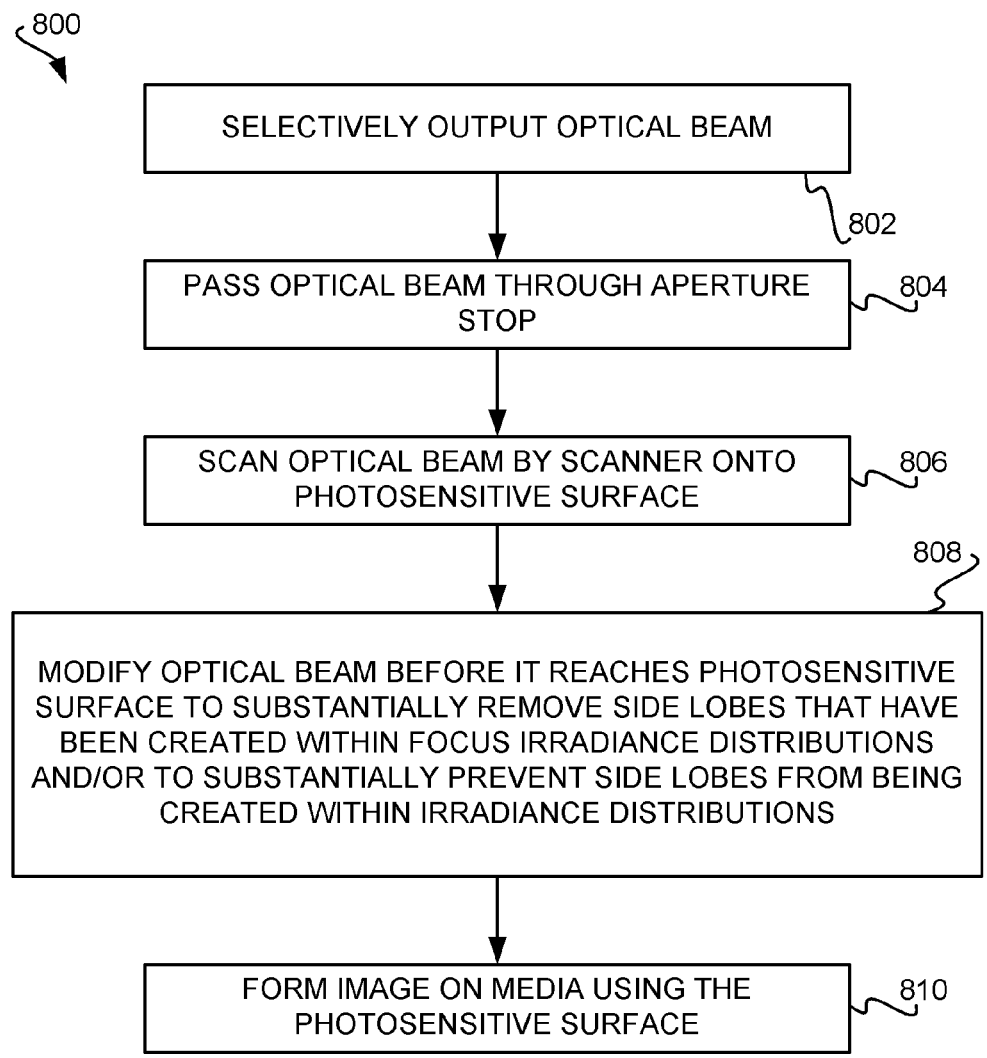
FIG. 8 is a flowchart of a method, according to an embodiment of the present disclosure.

FIG. 8 shows a summarizing method 800, according to an embodiment of the present disclosure. The method 800 is described in relation to the printing device 100. The optical beam 112 is output by the optical beam source 102 towards the scanner 108 in accordance with image data for a scan line of an image to be formed or printed by the printing device 100 (802). The optical beam 112 passes through the aperture stop 106 (804). As has been described, the aperture stop ordinarily creates side lobes 408 within the focus irradiance distribution of the image spots. The optical beam 112 is scanned by the scanner 108 through the scan lens 118 to selectively expose corresponding scan lines 202 on the photosensitive surface 110. Positions along these scan lines on the photosensitive surface 110 are selectively exposed in accordance with image data for corresponding positions (e.g., pixels) of the corresponding scan lines of the image (806).

The optical beam 112, however, is modified before it reaches the photosensitive surface 110 to substantially remove the side lobes 408 that have been created within the focus irradiance distribution, and/or to substantially prevent the side lobes 408 from being created within the focus irradiance distribution in the first place (808). First, as has been described in relation to FIGS. 5A, 5B, and 5C, in one embodiment the optical beam 112 may be filtered by using the apodization filter 501 having a spatially varying transmittance function 500 in the cross-scan direction to substantially prevent the side lobes 408 from subsequently being created when the optical beam 112 passes through the aperture stop 106 and is subsequently focused by the scan lens 118 to form the focus irradiance distribution.

Second, as has been described in relation to FIG. 6, in another embodiment the profiles of the optical beams 112 may be anamorphically reshaped by the cylindrical lens pair 602 and 604 to substantially prevent the side lobes 408 from subsequently being created when the beams 112 pass through the aperture stop 106 and are brought to focus by the scan lens 118. Third, as has been described in relation to FIG. 7, in another embodiment the optical beams 112 may be passed through the slit 702 located at a cross-scan image of the source to substantially remove the side lobes 408 that have already been created when the beams 112 passed through the aperture stop 106.

The method 800 concludes by exposing and developing the photosensitive surface and forming the desired image on media, such as paper. Where the photosensitive surface 110 is a photoconductor, as in the case of an electrophotographic printing process, the photoconductor has been selectively charged or discharged (810) during exposure. As has been described, the resulting charge pattern on the photoconductor surface 110 is developed with toner or ink such that the toner or ink stays on the photoconductor where the photoconductor has been charged (or discharged) and is subsequently transferred onto media, reproducing the image. In the case of dry toner, the electrophotographic printing device 100 is a laser printing device, and the toner may be fused onto the media in the pattern of the image so that it remains adhered to the media. In the case of liquid ink, the printing device 100 is a liquid electrophotographic (LEP) printing device, and the ink remains adhered to the media in the pattern of the image once the ink sufficiently dries. Alternatively, the photosensitive surface may be a part of the media itself, as in the case of a photographic emulsion, and image development may be done accordingly.

In conclusion, FIG. 9 shows a rudimentary block diagram of the printing device 100 that has been described, according to an embodiment of the present disclosure. The printing device 100 includes the optical beam source 102, the collimating lens 104, the aperture stop 106, the scanner 108, the scan lens 118 and the photosensitive surface 110, and one or more optical beam-modifying mechanisms 904. Where the printing device 100 is an electrophotographic printing device, it also includes an image forming mechanism 902

The image transfer mechanism 902 includes those components that develop the charge pattern on the photosensitive 110 and transfer the developed image to media like paper. In the case of dry toner, the mechanism 902 may include a toner applicator and a fuser, for instance, as can be appreciated by those of ordinary skill within the art. In the case of liquid ink, the mechanism 902 may include a binary ink developer (BID), as can also be appreciated by those of ordinary skill within the art.

The optical beam-modifying mechanisms 904 include those mechanisms that modify the optical beams 112 before they reach the photosensitive surface 110 to substantially remove the side lobes 408 that have been created within the focus irradiance distributions of the beams 112, and/or to substantially prevent the side lobes 408 from being created within the focus irradiance distributions of the beams 112. For instance, in the embodiment of FIGS. 5A, 5B, and 5C, the mechanisms 904 may include the apodization filter 501. In the embodiment of FIG. 6, the mechanisms 904 may include the cylindrical lenses 602 and/or 604. Finally, in the embodiment of FIG. 7, the mechanisms 904 may include the slit 702, and in some situations the relay lenses 704.

We claim:

1. A method comprising:

selectively outputting an optical beam toward a scanner in accordance with image data for a scan line of an image, the optical beam having a beam irradiance distribution that is substantially elliptical in shape;

passing the optical beam through an aperture stop, the aperture stop ordinarily creating one or more side lobes within a focus irradiance distribution of the optical beam;

scanning the optical beam by the scanner to form the scan line on a photosensitive surface by selectively exposing positions along the scan line in accordance with image data; and, modifying the optical beam before the optical beam reaches the photosensitive surface to substantially remove the side lobes that have been created within the focus irradiance distribution of the optical beam and/or to substantially prevent the side lobes from being created within the focus irradiance distribution of the optical beam, wherein modifying the optical beam before the optical beam reaches the photosensitive surface comprises passing the optical beam through a filter having a spatially varying transmittance function in a first direction to reduce an irradiance of the optical beam at a perimeter of the optical beam, the filter having a spatially uniform transmittance function in a second direction, and wherein the spatially varying transmittance function is at least substantially Gaussian.

* * * * *